United States Patent [19]

Taylor et al.

[11] 4,088,524

[45] May 9, 1978

[54] METHOD AND APPARATUS FOR CONTINUOUSLY APPLYING TREAD MATERIAL TO TIRE CASINGS AND CURING THE SAME

[76] Inventors: Don A. Taylor, Box 4, Wadsworth, Ohio 44281; Victor E. Buehrle, 365 Nye Dr., Akron, Ohio 44313

[21] Appl. No.: 676,727

[22] Filed: Apr. 14, 1976

[51] Int. Cl.² ............................................. B29H 17/36
[52] U.S. Cl. ................................... 156/129; 156/396; 156/405 R; 425/18; 425/38
[58] Field of Search ................. 156/96, 111, 123, 126, 156/127, 128, 129, 394, 396, 405; 425/18, 38, 60, 502, 397

[56] References Cited

U.S. PATENT DOCUMENTS

| | | | |
|---|---|---|---|
| 1,326,874 | 12/1919 | Macbeth et al. | 425/38 |
| 1,986,092 | 1/1935 | Abbott | 425/38 |
| 2,407,152 | 9/1946 | Haase | 156/111 |
| 3,455,764 | 7/1969 | Bryant | 156/128 |
| 3,746,597 | 7/1973 | Appleby et al. | 156/396 |

*Primary Examiner*—William A. Powell
*Assistant Examiner*—John E. Kittle

*Attorney, Agent, or Firm*—Reese Taylor

[57] ABSTRACT

A method and apparatus for applying pre-formed, uncured tread material at an elevated temperature to tire casings is disclosed wherein a number of tires may be processed simultaneously so as to utilize the advanced state of heat of the tread material to assist in curing of the tread, and bonding the same to the casing. The apparatus includes a plurality of stations and interconnecting conveyor means, whereby the uncured tread material can be applied to the tire casing and the assembled tire indexed into a curing mold for final curing, while simultaneously a separate station accomplishes application of tread material to a second casing which is then moved to a second station for curing purposes. The number of stations will be dictated only by the length of time involved in final curing, in that the time required for applying the treads to the casings is only a fraction of the time required for final curing. Thus, sufficient curing stations are provided to ensure that the assembled tires can be promptly transferred to the curing stations without appreciable diminishment of heat from the tread.

7 Claims, 4 Drawing Figures

METHOD AND APPARATUS FOR CONTINUOUSLY APPLYING TREAD MATERIAL TO TIRE CASINGS AND CURING THE SAME

BACKGROUND OF THE INVENTION

The invention in general relates to either retreading or building new tires utilizing pre-formed blank tread strips at elevated temperatures and pre-built tire carcasses or casings, and in particular relates to a method and apparatus whereby the advanced temperature of the pre-formed tread material can be utilized to assist in the overall cure of the tread in a retreading situation and the tread and the tire in a new tire situation, with the method and apparatus making it possible to more or less continuously form and cure tires.

DESCRIPTION OF THE PRIOR ART

Presently, there are known retreading a new tire manufacturing systems called "hot cap" systems which include the application of an uncured, pre-formed and heated tread strip, such as by extrusion, to a prepared tire casing following which the tire is placed in a heated press to heat it to its vulcanizing temperature to imprint the tread configuration and cure the tread.

The prior art consists of a number of known methods of forming the tread, either by extrusions or roll mills, or even a roll of press-formed tread stock. These systems bring the tread material up to a temperature considerably below scorch temperature following which it is applied to the tire casings. These assembled tires are then inserted into a curing apparatus, such as a mold, for final vulcanization.

One difficulty encountered in these methods is that the forming and tread applying structures are so advanced at the present time that the tread material can be, for example, extruded and applied to the tire in such short times as even 1 minute. Unfortunately, however, final vulcanization takes considerably longer; and in the present state of the art, the tread is applied to one tire which is then placed in the vulcanizing apparatus, and if it is desired to continuously utilize the tread material profiling and applying apparatus, successive tires are assembled but have to be stored. The alternative is to only run the tread profiling and applying apparatus intermittently which is not desirable.

One disadvantage of this is that since the tires will be stored for a considerable period, the heat induced in the tread material must be kept quite low to prevent uncontrolled curing during storage.

Another disadvantage is that the heat built up in the the tread material during forming will, of course, dissipate during storage, thereby necessitating that when the tire is finally placed in the curing mold, the temperature therein must be increased from room temperature to the vulcanizing temperature to effect a corresponding increase in the temperature of the tread and casing.

This is undesirable for a number of reasons.

First of all, as noted, it is either necessary to store the assembled tires and feed them into one mold at a time, or to operate the tread profiling the applying apparatus only intermittenly. Neither of these is totally satisfactory.

Second, elevating the temperature of the tread material and then allowing that heat to dissipate following which the heat has to be reinduced into the material is inefficient from the standpoint of energy expenditure.

Third, the time presently required to accomplish the heat build up for curing purposes reduces overall productivity.

SUMMARY OF THE INVENTION

It has been discovered that the aforenoted disadvantages can be overcome by providing a series of curing stations interconnected by conveyor means to the station for applying the tread material to the tire and providing means to communicate between the stations.

In this fashion, it has been found that one tire can be assembled and immediately transferred to a first station for curing purposes. At the same time the transfer is taking place, a second tire can be in the process of being assembled and then transferred to a second station for curing purposes. The number of stations can be multiplied indefinitely, with the ideal or optimum situation being that there are sufficient stations so that one press is at all times coming open and available to receive a previously assembled tire while the others are all full.

In this fashion, a continuous method of operation can be achieved, and the advanced temperature of the tread material can be utilized to assist in final curing, thereby reducing the amount of energy required to heat the vulcanizing chamber. This has the added advantage of reducing the total time the tire must remain in the press, thereby increasing productivity substantially.

Accordingly, production of an improved method and apparatus of the character above described becomes the principal object of this invention, with other objects thereof becoming more apparent upon a reading of the following brief specification, considered and interpreted in view of the accompanying drawings.

OF THE DRAWINGS

BRIEF DESCRIPTION OF THE PREFERRED EMBODIMENT

Apparatus

Figure 1:
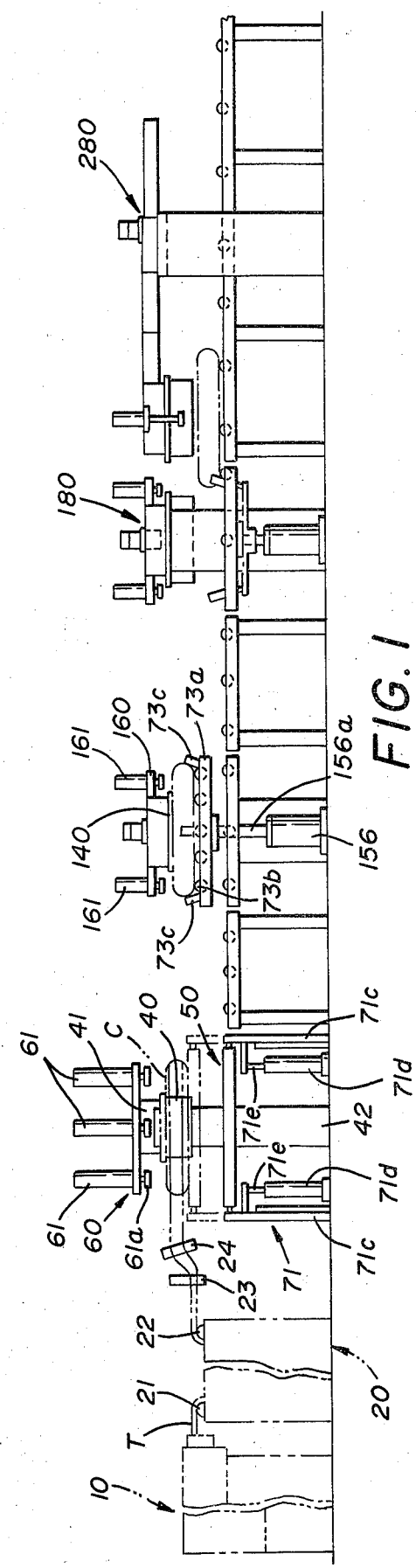
FIG. 1 is a front elevational view of the apparatus for accomplishing the method of the invention.
Figure 2:
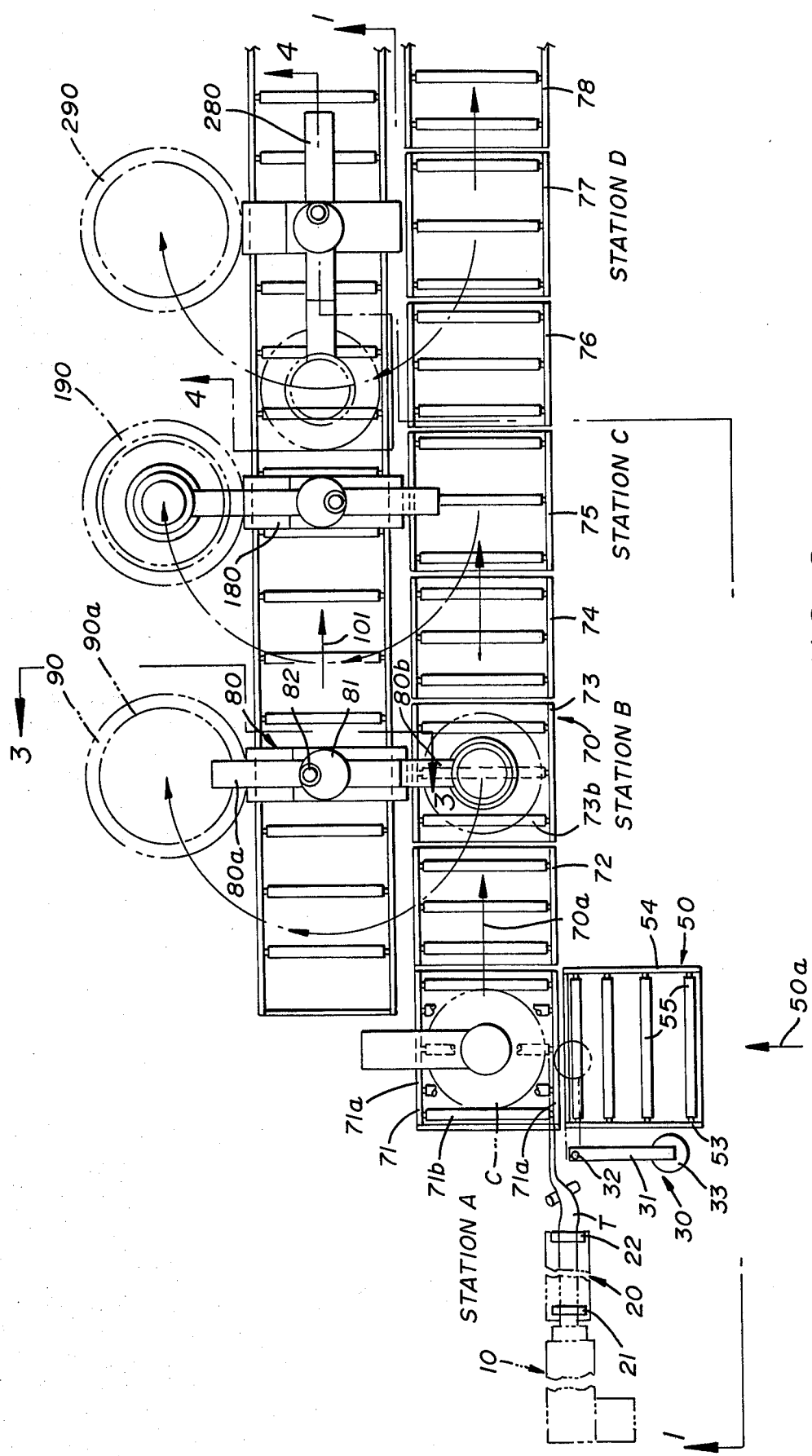
FIG. 2 is a top plan view of the apparatus.

The apparatus for accomplishing the method of the invention is best illustrated in FIGS. 1 and 2, and in general includes an extruding or tread-profiling device 10, an accumulator 20, an applicator mechanism 30, a first conveyor system 50, a tire handling mechanism 60, a second conveyor system 70, a plurality of tire engaging arms 80, 180 and 280, and a plurality of tire curing apparatus 90, 190 and 290, together with a secondary conveyor system 100.

It should be noted that four "stations" have been identified as STATION A, B, C, and D, with STATION A being the application station where the tread is formed and applied to the tire casing or carcass. STATIONS B–D are tire handling and curing stations and are identical.

The apparatus now to be described is located at STATION A.

Referring then to FIGS. 1 and 2, it will be noted that the tread-profiling apparatus or extruder 10 which forms the tread T is shown schematically only. There are a number of apparatus of this type known in the prior art. Furthermore, as noted above, the invention is not intended necessarily to be limited to the use of an extruder, but could utilize other means for forming the tread such as a roll mill or roll press, for example. Essentially, what is required is a known apparatus which can form profiled tread material at elevated temperatures in a more or less continuous fashion. It should be noted that the tread material is "blank" at this point; in other words, it does not have any tread design imprinted therein.

The accumulator 20 which includes rolls 21, 22, and directional rolls 23 and 24 is also illustrated schematically only since this structure is also well known in the prior art.

Suffice it to say that the apparatus need only be designed so as to provide the proper tension for the tread material T prior to application of the same to the tire casing or carcass C.

Referring to FIG. 2, the applicator mechanism 30 consists of an upright standard to which is pivoted an arm 31 which pivots about the point 32. The opposed end of the arm 31 includes a rotating stitching roll 33, with the arm 31 and roll 33 being movable from the full line position of FIG. 2 to the dotted line position thereof to stitch the tread material T to the casing C. Again, no great detail has been illustrated with regard to the applicator mechanism 30 since these machines are also well known in the art.

Still referring to FIG. 2, a first conveyor system 50 is also provided; and it will be noted that this first conveyor system 50 includes frame members 53, 54, with a plurality of rolls 55, 55 rotatably journaled there between. The tire casing C is moved onto this assembly in the direction of the arrow 50a, and thence onto the second conveyor system 70 which comprises sections 71, 72, 73, 74, 75, 76, 77, and 78.

The first conveyor section 71 includes horizontal frame members 71a, 71a and rollers 71b, 71b journaled there between. This section also includes telescoping vertical frame members 71c, 71c and hydraulic cylinders 71d, 71d. These cylinders include projecting rods 71e, 71e attached to frame members 71c, 71c, so that upon actuation of cylinders 71d, 71d, the conveyor section 71 can be elevated from the full line to broken line positions of FIG. 1 for purposes which will be more fully explained hereinafter.

A further feature of application STATION A is the existence of an expandable chuck 40 mounted on a framework 42, with the chuck being rotatable by means of drive mechanism 41. In this fashion, when the conveyor section 71 is elevated by utilization of the cylinders 71d, 71d, the tire C will be elevated so that the chuck can engage the center portion thereof, and upon expansion of the chuck, the tire will be firmly engaged.

At that time, the applicator arm 30 can be swung into position and the tread material T fitted on the periphery of the tire. The tire being rotated by means of the drive means 41 and chuck 40, the tread material will be fully applied thereto.

When the necessary amount of tread material T has been applied, the tread will be severed and spliced either manually or mechanically, as desired; and in this regard, means for performing this operation are known to those skilled in this art, and accordingly, no specific apparatus has been illustrated.

Disposed above the first conveyor section 71 is a frame 60 which carries a plurality of hydraulic cylinders 61, 61, the heads 61a, 61a of which, upon activation of the cylinders, will engage the sidewall and force the tire C off the chuck 40 which will have been collapsed, and down onto the top of the rollers 71b, 71b. If the conveyor section 71 is then returned to the full line position of FIG. 1, the tire can be moved away from STATION A in the direction of the arrow 70a (see FIG. 2) to the handling and curing stations.

Handling and curing STATIONS B, C, and D are identical, and only STATION B will be described in detail at this point.

Accordingly, STATION B consists of conveyor section 73 communicating with section 71 by means of fixed conveyor section 72. Section 73 has a framework 73a and a plurality of rollers 73b journaled therein. Centering and locating rollers 73c, 73c are also provided, and the entire conveyor section 73 is secured to a hydraulic cylinder 156 and cylinder arm 156a. Referring to FIG. 1 then, it will be seen that this section of the conveyor can also be elevated from the broken line to full line positions by the cylinder 156.

Mounted above and overlying conveyor section 73 is a transfer arm assembly 80. This arm assembly 80 includes a first end 80a and a second end 80b. The projecting end 80b carries an expandable chuck 140 which will be described in greater detail below. Suffice it to say at this juncture that when the conveyor section 73 is elevated, the chuck 140 will engage the assembled tire, and upon expansion of the same will firmly grasp it.

The conveyor section 73 then returns to its normal position, and the arm assembly 80 which is mounted for pivoting about the point 81 and is driven by the motor 82 swings in a clockwise direction 180° so as to bring the tire into registry with the opening of the curing mold 90 between the relatively movable platens 91 and 92 thereof. At that point, the cylinders 161, 161 mounted on frame 160 and carried by the arm can be operated to force the tire off the chuck 140 and into the mold cavity.

The arm assembly 80 is then swung away from the mold, and the mold can be closed for the required vulcanization period.

As illustrated in FIGS. 1 and 2, a plurality of such stations, in this instance three, are illustrated. The arm assembly 80, 180, and 280 are shown either in the original tire pick-up position (STATION B), rotated 180° to the mold insertion position (STATION C), or rotated 90° to the tire discharge position (STATION D).

Figure 4:
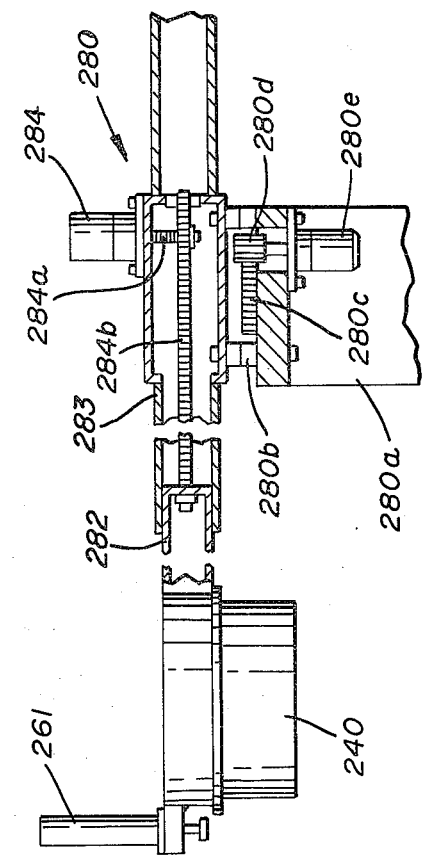
FIG. 4 is a sectional view taken on the line 4—4 of FIG. 2.
Figure 3:
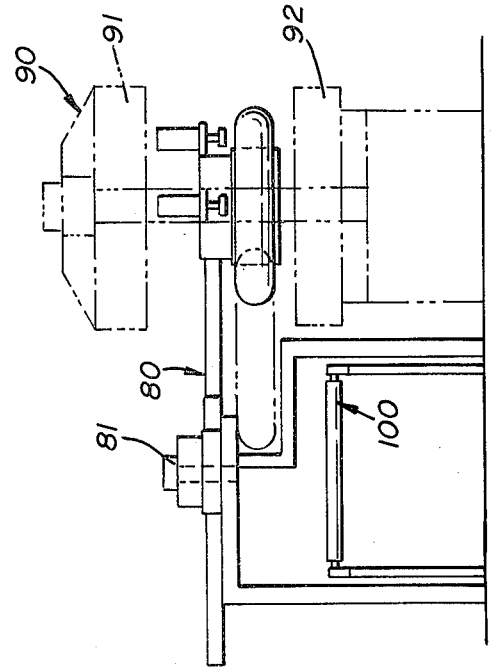
FIG. 3 is a sectional view taken on the line 3—3 of FIG. 2.

Referring to FIG. 4 for a detailed consideration of the arm assembly, the arm assembly 280 of STATION D will be described, with it being understood that the assemblies 80 and 180 of STATIONS B and C are identical.

Accordingly, the arm assembly 280 includes a support 280a which has a bearing 280b secured to the top thereof. An internal ring gear 280c is utilized and a pinion gear 280d is activated by the motor 280e to cause the entire arm assembly to rotate.

The arm itself consists of telescoping sections 282 and 283, with the outermost section 282 carrying the chuck 240 and the tire removal cylinder 261. The inner arm 283 carries a rack 284b and a pinion gear 284a which is driven by a suitable motor drive 284. The purpose of this is that on some occasions it will be necessary to telescope the arm inwardly before it is swung toward the curing chamber in order to avoid the stress posts of the press, if a press is being used for curing purposes.

Method of Operation

In use or operation of the improved apparatus, a tire casing or carcass C is first mounted on the conveyor system 50 and slid in the direction of the arrow 50a to the conveyor section 71 of STATION A. Cylincers 71d, 71d are then actuated to raise the conveyor section 71 and the tire casing or carcass C so that the chuck 40 can engage the same. The chuck is then expanded in known fashion in order to securely engage the tire.

Simultaneously, the tread-profiling mechanism 10 will have been activated with the tread material T, at about scorch temperature, passing through the accumulator 20 and to the periphery of the tire casing C. Applicator 30 then has arm 31 swung into position and the drive means 41 is actuated to rotate the tire with the tread being stitched to the periphery thereof, severed when the necessary amount of material has been applied and spliced.

Following this, the cylinders 61, 61 are activated to force the tire down off the chuck 40 onto the surface of the conveyor section 71 which is retracted to the full line position of FIG. 1. The tire is then slid in the direction of the arrow 70a to STATION B. Simultaneously, another tire will have been mounted on conveyor system 50 and slid into position for engagement with the chuck 40 at STATION A.

While the above noted step of applying the tread to the second tire is taking place at STATION A, the arm assembly 80 is activated at STATION B and swung into the position shown in FIG. 2. Conveyor section 73 is then elevated so that the chuck 140 engages the tire following which the arm assembly is moved clockwise 180° so that the tire is brought into the mold cavity. The chuck 140 is collapsed and cylinders 161, 161 are then activated to drop the tire into the mold cavity of the curing mold 90, and the arm is then rotated out of the mold opening. If stress rods are involved, it might be necessary during this operation to retract the extended telescoping portion of the arm assembly 80 until the 180° rotation has been accomplished, and then extend it. The curing mold 90 is then activated, with it being noted that the tread material T will retain a relatively high level of heat, thereby reducing the heat requirements of curing mold 90 and accelerating the curing time.

While the curing cycle is taking place at STATION B, the second tire having been assembled is moved in the direction of the arrow 70a to STATION C, wherein the next tire insertion cycle can be accomplished as described above. Simultaneously, another tire is being assembled at STATION A, and the number of stations required is dictated solely by the time of application of the tread material to the tire casing and the cure time so that at all times tires would be being constructed, cured, and ejected.

Finally, it will also be noted that a secondary conveyor system 100 is disposed behind and below the conveyor system 70 so that when a tire has been cured and the press opened, the arm system such as, for example, 280 at STATION D, can engage the tire, remove it from the press, rotate back 90°, and by actuating the cylinders 261 eject the tire from the chuck 240 onto the secondary conveyor system 100 following which the tire will be rolled off to the assembly point in the direction of the arrow 101.

As an example of the advantages of this invention, where present methods require 20 minutes, for example, for tread cure, this time can be significantly reduced by the method and apparatus of this invention. For example, a tread compound having a curing temperature of 300° F. would normally require a 20 minute cure time due to the necessity of raising the temperature from room temperature to 300° F.

However, if the tread material can have its temperature advanced to 275° – 290° F. at the tread forming station and be promptly applied to the casing and subjected to vulcanizing pressures in the mold, the temperature build-up in the mold is only on the order of 10° – 25° F. This results in a reduction of cure time to from 4 to 5 minutes.

The times and temperatures referred to are illustrative only and would naturally vary depending on the compound. However, the relative improvement in curing times between existing methods and the method of this invention would still exist.

While a full and complete description of the invention has been set forth in accordance with the dictates of the patent statutes, it should be understood that modification can be resorted to without departing from the spirit hereof or the scope of the appended claims.

Thus, it should be noted that the invention has equal utility either for recapping used tire casings or constructing new tires. In this regard, the term "casing" when used herein is intended to indicate either a used tire casing from which the tread has been removed or a new tire carcass prepared for reception of tread material.

What is claimed is:

1. A method of continuously applying preformed, uncured, blank tread material to pre-formed toroidial tire casings and curing the same in curing apparatus having relatively movable mold sections, comprising the steps of:
    A. continuously shaping the tread material and elevating the temperature thereof;
    B. applying a suitable length of said tread material at its elevated temperature to the periphery of a first casing;
    C. transferring said first casing and said tread material at its elevated temperature to the first of a succession of first curing apparatus and inserting it between the mold sections thereof;
    D. inducing the necessary curing temperature in said first curing apparatus;
    E. successively applying a suitable length of said tread material to the periphery of at least a second casing at its elevated temperature while said first casing is within said first curing apparatus;
    F. transferring said second casing and said tread material at its elevated temperature to another of said curing apparatus;
    G. inducing the necessary curing temperature in other curing apparatus;
    H. successively removing said casings from said curing apparatus; and
    I. repeating steps A through H so that said casings are transferred to said succession of curing apparatus while at their elevated temperatures and a plurality of casings are processed simultaneously with at least one of said curing apparatus being available to receive said casings as they are transferred thereto.

2. Apparatus for continuously assembling tread material at elevated temperatures to successive tire casings and curing the same in curing apparatus having relatively movable mold sections, comprising:

A. continuous tread material forming and heating means;
B. support means for releasably engaging said tire casings;
C. applicator means disposed between said material forming and heating means and said support means for applying said tread material to the peripheries of successive tire casings;
D. a succession of curing stations adequate in number to conform to the operating speed of said tread material forming and heating means and said applicator means so that at least one of said curing stations is available for receipt of each of said tire casings as they receive said tread material and each including a curing apparatus;
E. first transfer means for moving said tire casings to and away from said curing stations and into and out of said curing apparatus after application of said tread material; and
F. second transfer means for receiving said tire casings after removal from said curing stations.

3. The apparatus of claim 2 wherein said first and second transfer means include:
A. a plurality of conveyor sections; and
B. tire engagement means adjacent each curing station for transferring tires from one of said conveyor sections to said curing stations and from said curing stations to another of said conveyor sections.

4. The apparatus of claim 3 wherein:
A. each of said curing stations includes a curing apparatus; and
B. each of said tire engagement means includes,
1. a rotatable, horizontally disposed arm movable between said conveyor sections and said curing apparatus and into and out of the space between said mold sections.

5. The apparatus of claim 4 wherein said arm of each said tire engagement means is extendable and retractable along its longitudinal axis.

6. The apparatus of claim 2 wherein said second transfer means includes a tire receiving conveyor disposed between said conveyor sections of said first transfer means and said curing apparatus.

7. Apparatus for continuously assemblying tread material at elevated temperatures to successive tire casings and curing the same in curing apparatus having relatively movable mold sections comprising:
A. continuous tread material forming and heating means;
B. releasable support means for engaging said tire casings;
C. applicator means disposed between said tread material forming and heating means and said tread material for applying said tread material to the peripheries of successive tire casings;
D. a first horizontally disposed conveyor system;
E. a succession of curing stations disposed adjacent said first conveyor system and being adequate in number to conform to the operating speed of said tread material forming and heating means and said applicator means so that at least one of said curing stations is available for receipt of each of said tire casings as they receive said tread material and, each including;
1. tire curing apparatus, and
2. a tire transfer arm disposed between each said tire curing apparatus and said first conveyor system;
F. a second horizontally disposed conveyor system disposed between said first conveyor system and said tire curing apparatus and beneath said tire transfer arm; and
G. said transfer arm being selectively pivotally movable between said first conveyor system, said tire curing apparatus and said second conveyor system and into and out of the space between said mold sections.

* * * * *